US006823398B1

(12) United States Patent
Lee et al.

(10) Patent No.: US 6,823,398 B1
(45) Date of Patent: Nov. 23, 2004

(54) FILE SYSTEM MANAGEMENT EMBEDDED IN A STORAGE DEVICE

(75) Inventors: Lane W. Lee, Lafayette, CO (US); Michael B. Propps, Loveland, CO (US); Daniel R. Zaharris, Longmont, CO (US)

(73) Assignee: DPHI Acquisitions, Inc., Boulder, CO (US)

( * ) Notice: Subject to any disclaimer, the term of this patent is extended or adjusted under 35 U.S.C. 154(b) by 0 days.

(21) Appl. No.: 09/539,841

(22) Filed: Mar. 31, 2000

(51) Int. Cl.[7] ............................................... G06F 3/00
(52) U.S. Cl. ............................. 710/5; 710/68; 710/74; 710/105; 707/100; 707/101; 711/111; 711/112
(58) Field of Search ............... 707/10, 200, 100–104.1; 710/260, 5, 68, 74, 105; 711/111–114

(56) References Cited

U.S. PATENT DOCUMENTS

| | | | |
|---|---|---|---|
| 5,023,854 A | 6/1991 | Satoh et al. | 369/32 |
| 5,247,494 A | 9/1993 | Ohno et al. | 369/13 |
| 5,333,315 A | 7/1994 | Saether et al. | |
| 5,463,772 A | 10/1995 | Thompson et al. | |
| 5,787,460 A * | 7/1998 | Yashiro et al. | 711/114 |
| 5,850,382 A | 12/1998 | Koishi et al. | 369/275.3 |
| 5,931,935 A * | 8/1999 | Cabrera et al. | 710/260 |
| 6,389,427 B1 * | 5/2002 | Faulkner | 707/104.1 |
| 6,449,607 B1 * | 9/2002 | Tomita et al. | 707/3 |

FOREIGN PATENT DOCUMENTS

| | | |
|---|---|---|
| WO | WO 98/24025 | 6/1998 |
| WO | WO 99/08173 | 2/1999 |

OTHER PUBLICATIONS

IBM, Directory Maintenance VM/ESA, Diagnosis Reference, Release 5.0.*
IBM Directory Maintenance (DirMaint VM/ESA), Diagnosis Reference, Jul. 1999, International Business Machine, Version 1, Release 5, p. 104.*

* cited by examiner

Primary Examiner—Jeffrey Gaffin
Assistant Examiner—Mike Nguyen
(74) Attorney, Agent, or Firm—MacPherson Kwok Chen & Heid LLP (57) ABSTRACT

A file system for accessing information on digital storage media is provided by a storage device controller embedded within the storage device. The storage device controller includes an interface component to receive a packet having a file system command. A command decode component in the storage device controller decodes the file system command, and an interface response structure component creates a strategy for performing the file system command. The storage device controller generates an identifier for a file system object and accesses the file system object using the file system object's identifier. A host system coupled to the storage device receives a storage device access request from an application program and generates a command to perform on the file system object based on the storage device access request. The host system uses the identifier to indicate the file system object to be accessed.

36 Claims, 4 Drawing Sheets

FILE SYSTEM MANAGEMENT EMBEDDED IN A STORAGE DEVICE

BACKGROUND OF THE INVENTION

1. Field of the Invention

This invention relates generally to computer file systems. More specifically, this invention relates to a file system embedded in a storage device.

2. Description of the Related Art

Downloading copies of movies, music recordings, books, and other media via computer networks such as the Internet, is becoming increasingly popular. There are also an increasing number of different types and sizes of devices available to consumers for accessing the downloaded information. One concern, however, is protecting both downloaded and pre-recorded media from unauthorized access, copying, and distribution.

Most prior art storage devices, including hard drives, floppy drives, write once read many (WORM) drives, such as CD-ROM and DVD drives, are classified as block level devices. Prior art devices for accessing media in digital formats as shown for example in FIG. 1, typically include host system 100 coupled to one or more data storage devices 102, 104, 106 containing storage media. In the prior art, host system 100 includes file system manager 108 and host device drivers 110, 112, 114 which translate file commands from user application program 116 to commands recognized by device drivers 1 18, 120, 122 for storage devices 102, 104, 106. Application programs include any software or firmware in host system 100 that request access to storage devices 102, 104, 106.

Figure 1:
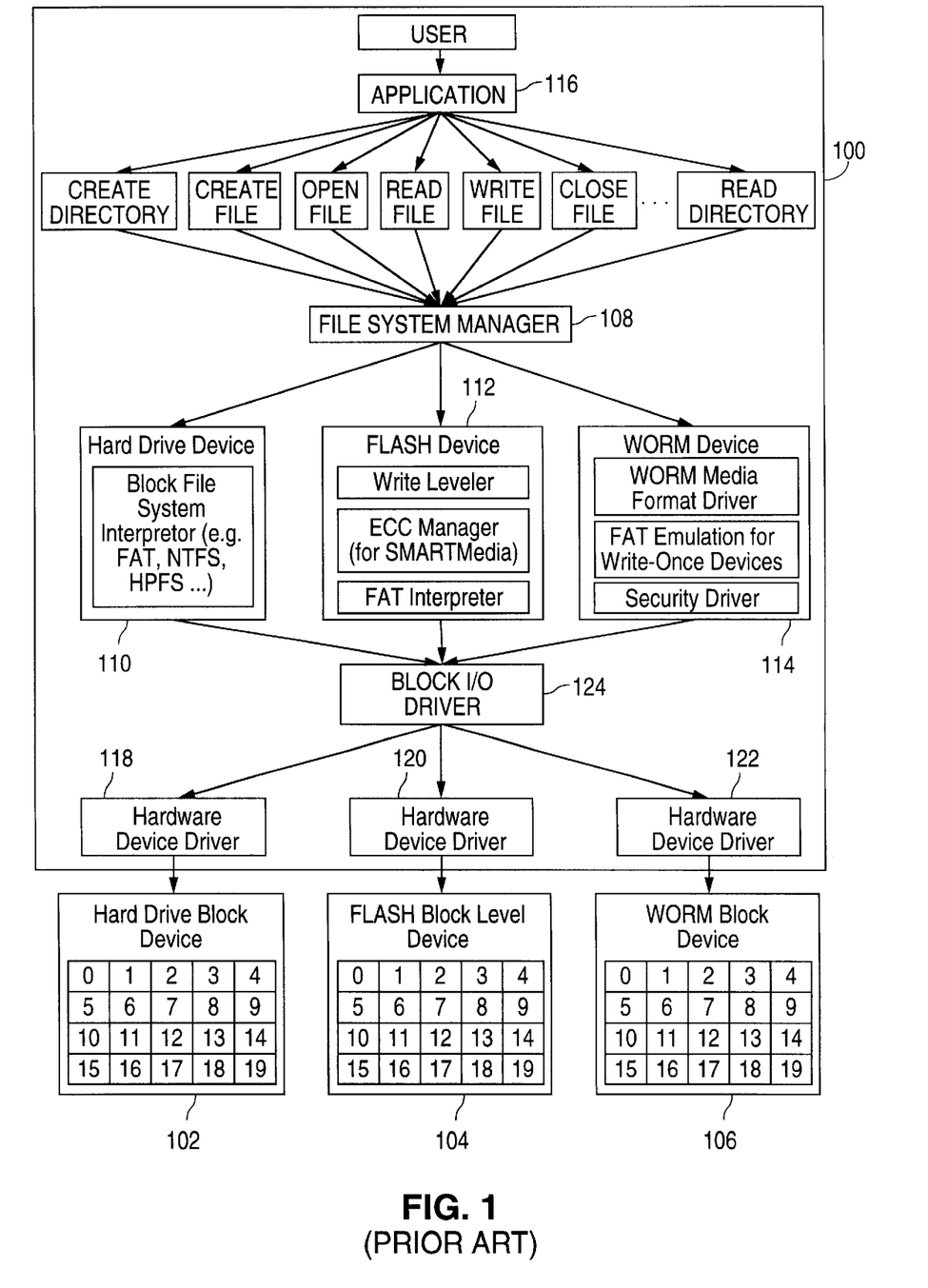
FIG. 1 is a block diagram of a prior art block file system implemented in a host system coupled to different types of storage devices.

Host system 100 reads and writes to storage devices 102, 104, 106 on block boundaries. Traditionally, the knowledge of the file system format is placed in block input/output (I/O) driver 124 in host system 100, and storage devices 102, 104, 106 have no knowledge of the file system format that is used on the storage media (not shown).

Thus prior art storage devices 102, 104, 106 are relatively "dumb", in that they simply read or write the blocks requested by host system 100. In some cases, storage device drivers 118, 120, 122 include caching algorithms that try to predict what host system 100 will request next and pre-read that information. These algorithms, in general, do not have the benefit of knowing the file structure on the media, and therefore, often fail to optimize correctly, especially in cases where files are fragmented on the media.

Host block I/O driver 124 for block file systems is quite complicated as it must understand the type of storage device it is communicating with, and a different device driver 118, 120, 122 for each different type of storage device 102, 104, 106. Some storage devices, such as hard drives, have been standardized to the point where a single driver will work on multiple types of hard drives. Other devices, particularly specialty devices such as flash memory cards, generally require a different driver that understands the underpinnings of that device. These drivers can become very complicated, thereby making it difficult to port the drivers to different platforms. The cost of developing drivers for specialty devices is very high. Each driver must be able to perform all the commands (read file, write file, create directory, etc.) that are requested from the application. Because each driver must implement a complete set of commands, significant resources are used to manage many different devices.

Further, each time a storage device changes, device drivers 110, 112, 114 on host system 100 must be aware of the change. For example, the CD-R device drivers are significantly different than the CDROM device drivers that preceded them. This is because the underlying technology of the storage device changed, thus requiring host system 100 device drivers to track those changes.

Devices used by consumers for playing music and movies range from home theatre systems to highly portable palmtop devices. Accordingly, there is a need to provide a storage device and storage medium that is compact and portable, yet capable of storing and transmitting large amounts of data for real-time playback. The storage device must also interface with a wide variety of hosts such as personal computer systems, televisions, audio systems, and portable music players. Further, it is important for the storage device to protect content on the storage medium using a digital rights management scheme.

SUMMARY OF THE INVENTION

A file system for accessing information on digital storage media in a storage device is included in a storage device controller in the storage device. The storage device controller includes an interface component to receive a packet having a file system command. A command decode component in the storage device controller decodes the file system command, and an interface response structure component creates a strategy for performing the file system command. The storage device controller generates an identifier for a file system object and accesses the file system object using the file system object's identifier. A host system coupled to the storage device receives a storage device access request from an application program and generates a command to perform on the file system object based on the storage device access request. The host system uses the identifier to indicate the file system object to be accessed.

In one feature of the present invention, the file system manager correlates the identifier to pathnames used in application programs for the file system object. One advantage of this feature is that only the identifier is required for the host system to access an entire file system object.

Another feature of the file system includes library functions to create and remove file system objects, to store and retrieve information, to set and retrieve attributes of the file system object, to retrieve file system statistics, to retrieve identifiers, and to set and retrieve a type identifier for the file system object. The type identifier indicates the format of the content within a file.

Embodiments of the present invention may be used with a variety of storage devices including magnetic and optical storage systems. Security features are included within the storage device to prevent unauthorized access to file system objects. One advantage of this implementation is that security information is not stored on the host device, and is therefore not accessible to users.

Other features of the present file system include means to lock and unlock the storage media in the storage device, and provide indications to the host system when storage media is inserted in the storage device.

Advantageously, the present file system is compatible with a variety of different host devices because all accesses to storage devices are at a file and directory level using the identifier. The host system does not need to have knowledge of the type of storage device with which it is communicating. Therefore, the file system manager and translator are easily ported to different host systems.

Another advantage of present file system is that it facilitates read-ahead caching because the storage device knows the structure of the file and does not have to wait for block information from the host system.

Another advantage of file system over block devices is that the format of the storage media may change without requiring any change to the file system manager or translator.

The foregoing has outlined rather broadly the objects, features, and technical advantages of the present invention so that the detailed description of the invention that follows may be better understood.

DETAILED DESCRIPTION

Figure 2:
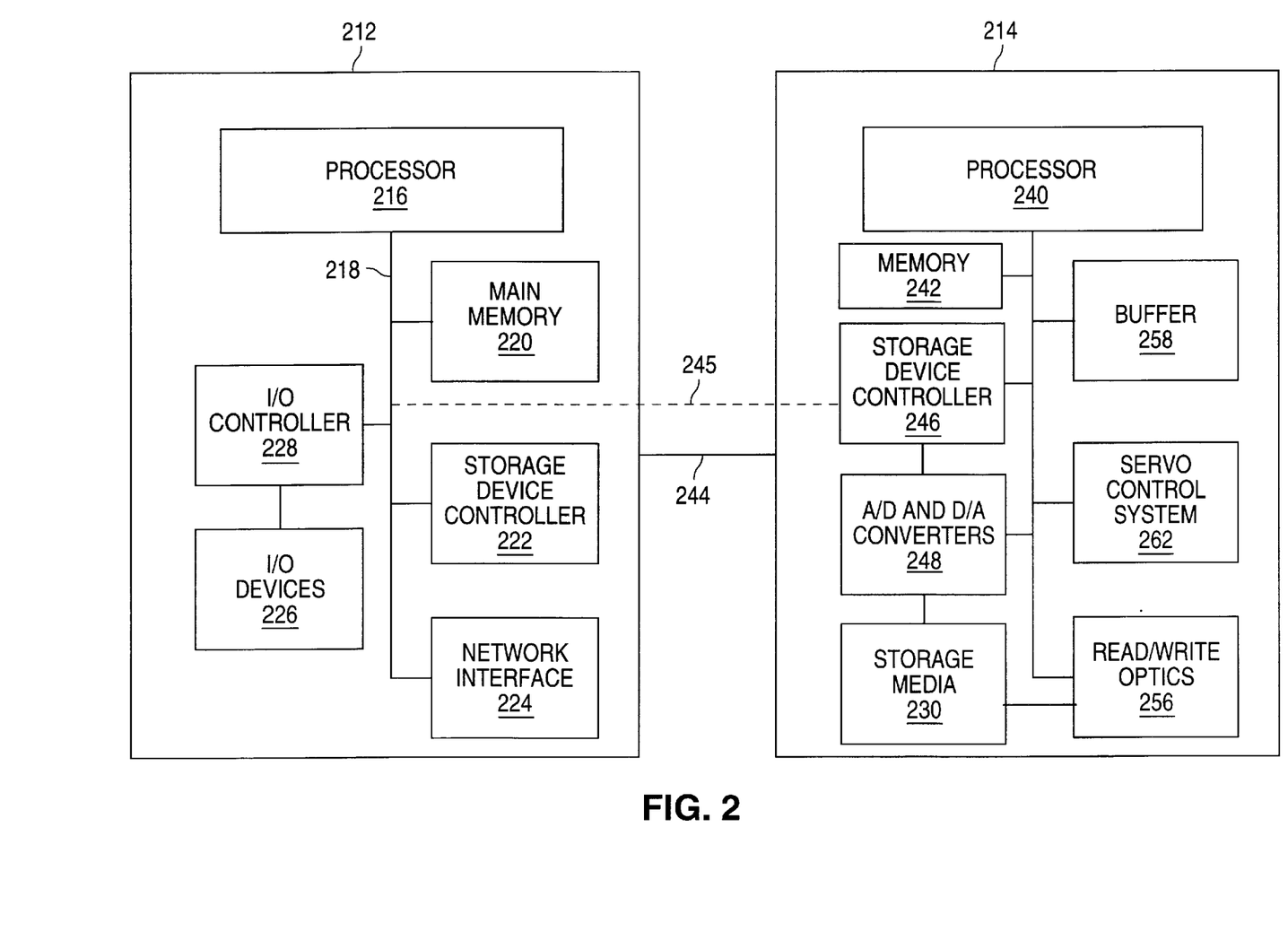
FIG. 2 is a block diagram illustrating the general architecture of a host system coupled to a data storage device in accordance with the present invention.

FIG. 2 shows a block diagram of components comprising one example of host system 212 and storage device 214 with which the present invention may be utilized. In host system 212, one or more processors 216 are connected by host bus 218 to main memory 220, storage device controller 222, network interface 224, and input/output (I/O) devices 226, connected via I/O controller 228. Those skilled in the art will appreciate that host system 212 encompasses a variety of systems that are capable of processing information in digital format including, for example, televisions, stereo systems, handheld audio and video players, digital cameras, portable computers, personal digital assistants, and other devices that include information processing components.

With the present invention, information may be preloaded on storage media 230, or a user may download information from a source, such as the Internet, using one type of host system 212. Storage media 230 containing the downloaded information may then be removed from storage device 214 and used with another compatible storage device 214 capable of reading and/or writing to storage media 230. Storage device 214 may be embedded in host system 212 or plugged in as an external peripheral device. Accordingly, host system 212 includes the appropriate hardware and software components to transfer, encrypt/decrypt, compress/decompress, receive, record, and/or playback audio, video, and/or textual data, depending on the functionality included in host system 212. Such components may include audio and video controllers, peripheral devices such as audio system speakers, a visual display, keyboards, mouse-type input devices, modems, facsimile devices, television cards, voice recognition devices, and electronic pen devices.

Storage device 214 includes processor 240 coupled to memory 242 which may be one or a combination of several types of memory devices including static random access memory (SRAM), flash memory, or dynamic random access memory (DRAM). Storage device 214 is coupled to host system 212 via bus 244. Alternatively, storage device 214 may be coupled directly to host bus 218 via bus 245, and the functions performed by storage device controller 222 may be performed in processor 216, or another component of host system 212.

Storage device controller 246 receives input from host system 212 and transfers output to host system 212. Processor 240 includes operating system instructions to control the flow of data in storage device 214. In one embodiment, but 244 is a parallel, asynchronous, eight-bit data bus capable of accessing file system objects using a single identifier between host system 212 and storage device 214. A communication protocol for bus 244 is described in copending U.S. patent application Ser. No. 09/539,842, entitled "Asynchronous Input/Output Interface Protocol" which was filed on the same day as the present invention, is assigned to the same assignee, and is hereby incorporated by reference.

This communication protocol comprises an asynchronous interface protocol for transmitting variable-sized packets between a host system and a storage device. The protocol supports a parallel data bus for transmitting data between the host system and the storage device. A plurality of address signals indicate whether the packet includes command, data, or status information. An enable signal indicates when the packets may be transmitted to and from the storage device. Read and write strobe signals are also included to allow the host to request data from and transmit data to the storage device.

The protocol includes an extensible command set which includes a function code, one or more interrupt requests, and signals to indicate when the storage device is busy, when the storage device is ready to transfer data, when the storage device is ready to receive bytes from a command packet, when the storage device is ready to receive or transit a data block, and when the storage device is ready to transmit status bytes.

The interface protocol is a relatively simple, low-level interface that supports a sophisticated, variable-length packet-based, extensible command set, and asynchronous events. This offers advantages not found in prior art interfaces, where the simpler interfaces are not typically packet-based, nor do they support commands other than read and write input and output.

The interface protocol enables various types of host systems to communicate with various types of storage devices without knowledge of the type of storage device being used. The interface protocol also supports data transfers of various sizes of blocks, up to the maximum number of bytes per packet the storage device and host systems are capable of handling, thereby potentially reducing the number of packets to transit and speeding up the data transfer process.

In one embodiment, data is transmitted to and from storage media 230 via read/write optics 256. In other embodiments, data is transmitted to and from storage media 230 via read/write electronics (not shown). The data may be converted from analog to digital format, or from digital to analog format, in converters 248. For example, analog data signals from read optics 256 are converted to a digital signal for input to buffer 258. Likewise, digital data is converted from digital to analog signals in converter 248 for input to write optics 256. Buffer 258 temporarily stores the data until it is requested by controller 246.

Servo control system 262 provides control signals for actuators, focus, and spin drivers that control movement of the optical or magnetic head over the storage media 230.

One skilled in the art will recognize that the foregoing components and devices are used as examples for sake of conceptual clarity and that various configuration modifications are common. For example, although host system 212 is shown to contain only a single main processor 216, those skilled in the art will appreciate that the present invention may be practiced using a computer system that has multiple processors. In addition, the controllers that are used in the preferred embodiment may include separate, fully programmed microprocessors that are used to off-load computationally intensive processing from processor 216, or may include input/output (I/O) adapters to perform similar functions. In general, use of any specific example herein is also intended to be representative of its class and the non-inclusion of such specific devices in the foregoing list should not be taken as indicating that limitation is desired.

Figure 3:
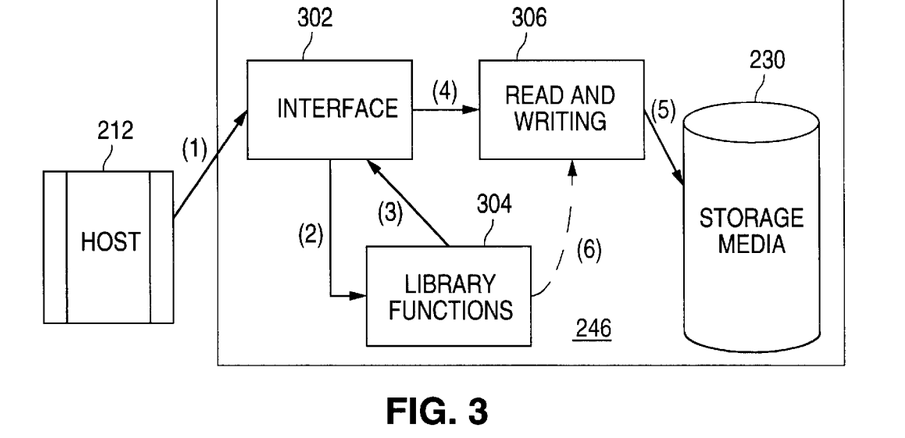
FIG. 3 is a block diagram of file system components in a storage device in accordance with the present invention.

Referring now to FIG. 3, the sequence of messages communicated between host system 212 and components in storage device controller 246 when executing a command is represented by numbered arrows. In one embodiment, the following sequence occurs:

1) To initiate a file system command, host system 212 sends a packet containing the command to interface component 302 in storage device controller 246 via bus 244.

2) Interface component 302 parses the command from the transport information in the packet and delivers the command to library functions 304.

3) Library functions 304 decode the command, and create a strategy for performing the requested operation. The strategy is returned to interface component 302.

4) Interface component 302 then executes the strategy by directing reading and writing component 306, as needed, to perform storage media access functions and transfer data to or from host system 212.

5) Reading and writing component 306 transfers data to and/or from storage media 230, as directed by interface component 302.

6) For some commands, library functions 304 direct reading and writing component 306 directly to accomplish a task.

Figure 3A:
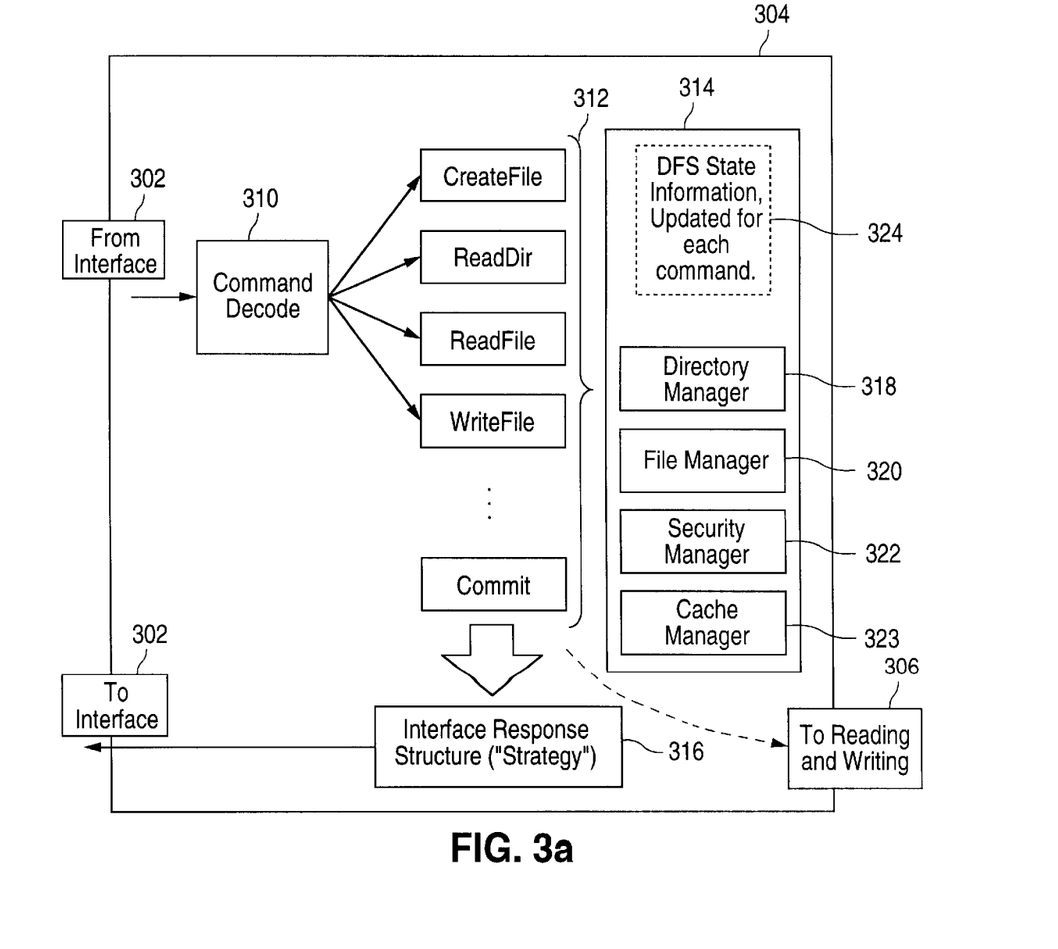
FIG. 3a is a block diagram of library components for file system management in accordance with the present invention.

FIG. 3a shows components of library functions 304 including command decode 310, individual command execution routines 312, and support functions 314.

Command decode 310 decodes the command from the command packet and passes control to the individual command execution routines 312, as appropriate for the command.

Individual command execution routines 312 parse the remainder of the command packet to obtain file system object identifiers, attributes, and names. Support functions 314 are used by command execution routines 312 to manipulate the file system objects accessed by the particular command. Some functions, such as a 'Commit' function (described hereinbelow), call reading and writing component 306 to access the file system area of storage media 230. Command execution routines 312 also create interface response structure (i.e., the strategy) 316 that tells storage device controller 246 how to handle the data transfer between storage media 230 and host system 212.

The strategy is a set of directives for performing the requested operation. The strategy may include, for example, whether to read or write from storage media 230, the physical location on storage media 230 where the data resides, how much data should be read or written, and how much data should be transferred to host system 212. Further, during read operations, the strategy may not involve accessing storage media 230, as some information may be cached into buffer memory and transferred directly from the buffer to the host.

Each individual command execution routine 312 may make calls to support functions 314, of which there are four main components: directory manager 318, file manager 320, and the security manager 322, and cache manager 323. These components maintain the internal structures associated with file system. Security manager 322 controls the access rights associated with each file and directory on storage media 230. Security manager 322 may also encrypt and decrypt the data, as required, using one of several encryption or security schemes known in the art.

Storage media 230 includes a file system area that is not accessible to the user through interface 302. Therefore, security information such as encryption/decryption keys may be stored on storage media 230 along with other file system information. The host does not have access to these areas except through strong security protocols, such as the security protocol described in copending U.S. patent application Ser. No. 09/542,510, entitled "Digital Rights Management within an Embedded Storage Device" which was filed on Apr. 3, 2000, is assigned to the same assignee, and is hereby incorporated by reference.

Each object within the file system is unique, therefore, different components that make up the file system information may be stored separately and then put together internally to provide complete information about the file system object. For example, security information for a particular file can be stored separately from the file information (file size, etc.), and may be done so in a secure manner.

Each command updates state information component 324, which contains information that may need to be used between commands. For example, the 'ReadDir' command must maintain a value which describes how much of the directory structure has been passed to host system 212 on previous 'ReadDir' commands.

Referring again to FIG. 3, some variations to storage device controller 246 may include:

1) Storage media 230 may be fixed inside storage device 214 (FIG. 2), or it may be removable.

2) Storage device controller 246, reading and writing component 306, and library functions 304 may be implemented as separate threads in a multitasking operating system, as known in the art, or may be a single thread, or any combination thereof.

3) Command decode 310 may be handled within interface component 302.

4) Library functions 304 may communicate directly with read and write firmware 306 for data access commands directly rather than providing interface response structure 316 to storage device controller 246.

5) Security manager 322 may support one or more of various digital rights management schemes.

It is recognized by those skilled in the art that the components in storage device controller 246 may be implemented in hardware, software, firmware, or by a combination of hardware, software, and/or firmware.

Figure 4:
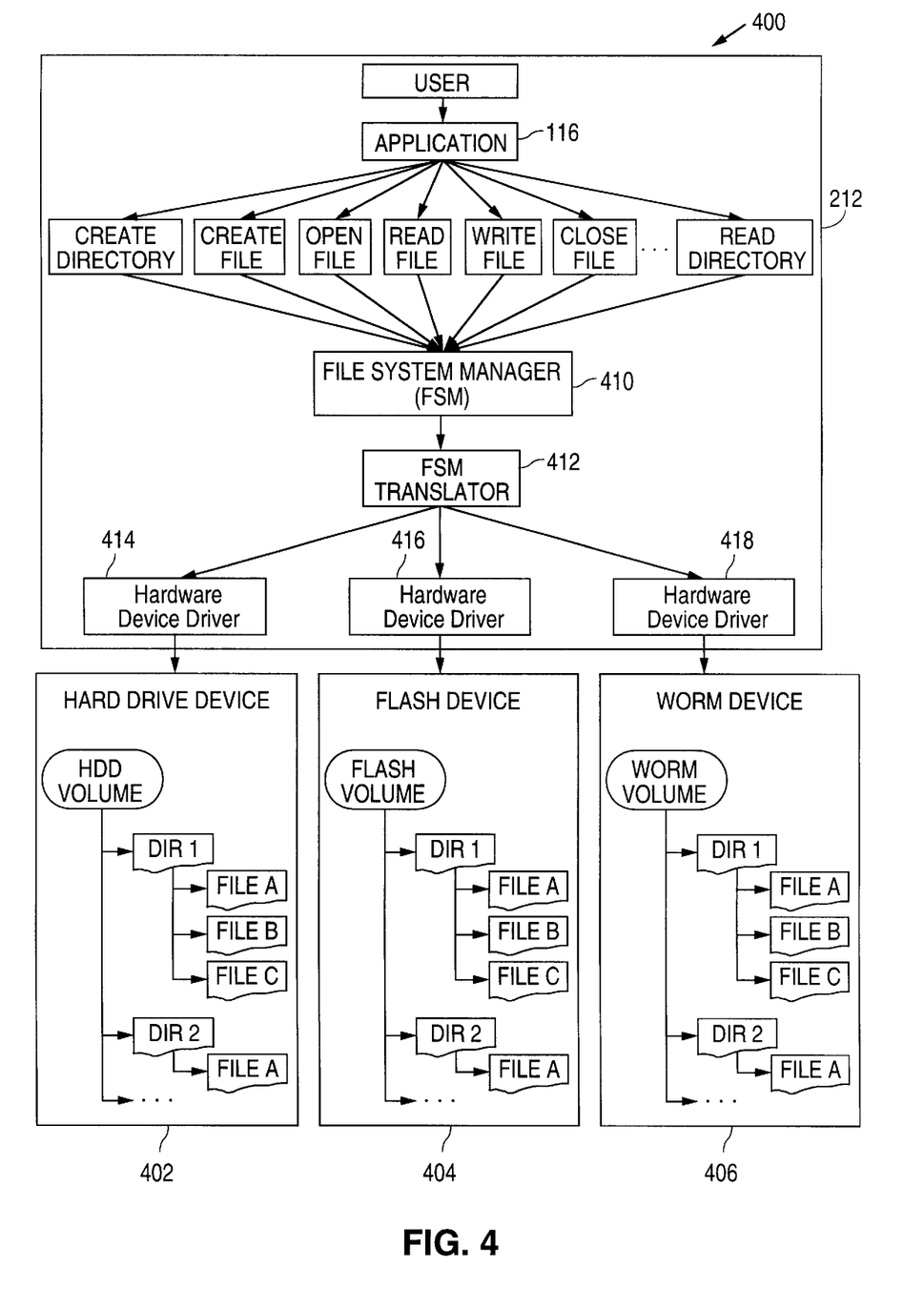
FIG. 4 is a block diagram of a file system in accordance with the present invention implemented in a host system coupled to different types of storage devices.

Referring now to FIG. 4, file system 400 according to the present invention is shown implemented with three different types of storage devices including hard drive device 402, flash device 404, and write once read many (WORM) device 406. Host system 212 includes file system manager 410, translator 412, and one or more device drivers 414, 416, 418. The number and type of device drivers 414, 416, 418, depends on the types of hardware interfaces used to interface the storage devices with host system 212. File system 400 provides access to a fully hierarchical directory and file 20 structure in storage devices 402, 404, 406, with individual files having full read and write capabilities.

File system manager 410 regards each storage device 402, 404, 406 as a volume containing a set of files and directories. These file system objects may be accessed by name or other designator associated with the file system object. In one embodiment, file system manager 410 receives commands from application programs 116 to create, rename, or delete files and directories, and to read or write data to files. File system manager 410 also receives information regarding data to transmit or receive from storage devices 402, 404, or 406. This information includes the storage device and the name of the file or directory to be accessed by host system 212.

In one embodiment, file system 400 includes rules that apply to volume, file, and directory names. For example, the length of names within the file system may be limited. Further, only the binary equivalent of the names may be used by storage devices 402, 404, 406, to allow the devices to be independent of the character set used by host system 212.

In the prior art, file and directory manipulation commands typically required full pathnames for identification. One feature of file system 400 is that file system manager 410 parses the pathnames of directories and files, and passes only the name of the directory or file to translator 412. Translator 412 calls the appropriate storage device to convert the names to unique identifiers that are used by file system manager 410 on subsequent accesses.

Application programs 116 may be written in different programming languages that use different commands for accessing files and directories. Storage devices 402, 404, 406 also includes their own set of commands for accessing files and directories. Translator 412 receives application program commands from file system manager 410 and determines one or more corresponding commands recognized by storage devices 402, 404, 406 to access files and directories as requested by application programs 116. Translator 412 also constructs command packets that include information such as file system object identifiers to be accessed, and the commands to be performed. The command packets are transmitted to hardware device drivers 414, 416, 418, as required, depending on the commands issued by application programs 116. Various types of data busses may be utilized to transfer data between host system 212 and storage devices 402, 404, 406, and hardware device drivers 414, 416, 418 add a transport protocol, as known in the art, for routing the command packet to the corresponding storage device 402, 404, 406.

The following table lists one embodiment of a set of commands recognized by translator 412 and storage device controller 246 (FIG. 3), and how they are used within file system 400. Each command is described in subsequent paragraphs.

| Command | Inputs | Outputs | Description |
| --- | --- | --- | --- |
| Commit | None | Status code | Commit all unwritten data to disk. |
| CreateDir | Directory identifier, name, attributes | Status, New directory identifier | Create a new directory within a directory. |
| CreateFile | Dir identifier, name, attributes | Status code, New Identifier | Create a new file within a directory. |
| GetAttributes | Object identifier | Object Attributes | Retrieve attributes for given file/directory. |
| GetMediaInfo | None | Media Information | Return dynamic statistics of file system to host. |
| GetIdentifier | Directory identifier, name | Identifier | Get file or directory identifier for an object in a given directory |
| SetAttributes | File identifier, Attributes | Status code | Set attributes for given file/directory |
| ReadDir | Directory Identifier, Buffer size | File/ Directory entries in directory | Return directory entries to host. |
| ReadFile | File identifier, offset, byte count | File data, Status code | Read data from selected file |
| Remove | Object Identifier | Status Code | Remove a file or directory from a directory. |
| Rename | From identifier, To directory identifier, name | Status Code | Rename/move directory or filename. |
| WriteFile | File identifier, offset, count, Data | Data written/ cached | Writes data to a given file. |

Commit

The 'Commit' command transfers all necessary information from a temporary data buffer 258 (FIG. 2), also referred to as a cache, on storage device 402, 404, 406 to the storage medium in storage device 402, 404, 406. Host system 212 may choose to commit the information in order to be sure it is permanently stored in storage device 402, 404, 406.

If an error occurs while writing the buffered information, the status indicator will continue to indicate that the data is cached at completion of the command, and an error code is returned.

CreateDir

The 'CreateDir' command creates a directory or subdirectory within the specified directory. The directory entry is created within the memory of storage device 402, 404, 406 but is not necessarily written to the media. The storage device ensures the entry is written to the media prior to media removal.

Initial attributes, such as protection level for the directory, may be specified. The directory entry is created with no files or subdirectories attached. The new directory is a subdirectory of the input parent directory.

Permission may be denied for creating directories under the following conditions:

a. The destination directory in which to create has the file system GUARDED or READONLY attribute.

b. A security key, or other digital rights scheme, protects the destination directory.

If the create function occurs successfully, then storage device 402, 404, 406, transfers an identifier for the newly created directory to file system manager 410.

CreateFile

The 'CreateFile' command creates a file object within the given directory. It is analogous to the 'CreateDir' command.

The file entry is created with a file length of zero, and the returned identifier may immediately be used in a 'WriteFile' command. The input file 'Data Type' is stored with the file to describe the format of the data contained within the file.

GetAttributes

Returns the attributes of a file system object to host system 212.

GetFileInfo

Host system 212 may query for information relating to a particular file by issuing the 'GetFileInfo' command. The returned information includes:

a. The attributes for the file.

b. The type of file as set when the file was created.

c. The time of last modification of the file, or creation time if never modified.

d. The size of the file in bytes.

Storage devices 402, 404, 406 store a 'file type' identifier with every file. This identifier can be used by applications 116 to determine whether it is the type of file that it can read. In one embodiment, the file type identifier includes two regions:

a. Registered file types are file types that have been registered with an overseeing organization. These files have a specific and well-defined format type that may or may not be in the public domain. In one embodiment, the registered file types are numbered 0-32767 (0000-7FFFh).

b. Unregistered file types are file types that are user defined. There is no guarantee that a particular file type is not used by another vendor. In one embodiment, the unregistered file types are numbered 32768-65535 (8000h-FFFFh).

Data types are intended to provide a mechanism for host system 212 to search for file types that they are capable of accessing. For example, a MP3 player may search for all MP3 files, and ignore all other files.

Each file and directory in the file system has a set of attributes that may be used to control the user access. The attributes are defined when a file is created, or may be modified at a later time. The following table lists some examples of attributes that may be used with files and directories:

| ATTRIBUTE | EXPLANATION |
|---|---|
| GUARDED | Guarded files and directories may not be modified in any way. The guarded attribute is a write once attribute. Once set, the user may not clear it. The guarded attribute is used to protect the data on the disk from any intervention from the user. The user may not write, delete, rename, move or modify the attributes of a guarded file or directory. Directories that are marked as guarded do not implicitly guard all the files and directories below it. Each file system object must be marked as guarded individually |
| HIDDEN | A hidden file or directory will not be passed to the user during a 'ReadDir' command. A 'GetIdentifier' command will correctly return the directory or file identifier. The user may modify this bit using 'SetAttributes', given the correct identifier. |
| READONLY | The read only attribute prevents the user from writing, renaming, or moving a file. The read only attribute may be explicitly removed through the use of the 'SetAttributes' command. |
| TYPE | This attribute tells the type of the object for which a particular file system identifier refers. The possible types of objects are file object, which contains user data, and directory object, which contains files and other directories. |

GetIdentifier

'GetIdentifier' searches the specified directory for an object that has a certain name. The name search is conducted on a binary byte-by-byte basis. If the name is found, then a unique identifier is returned for that object.

A special name is reserved to look up the parent directory of the given directory. This name is ".." in the ASCII character set. The parent directory of the root directory returns the root directory identifier.

GetMediaInfo

'GetMediaInfo' returns the current information for the media. This command is used to get initial media information when a new piece of media is inserted into storage device 402, 404, 406.

ReadFile

'ReadFile' reads data from the disk starting from the given byte offset and continuing for the requested number of bytes.

If the end of the file is encountered before the input byte count value is exhausted, then the data transfer is terminated with the last byte of the file, and an 'end of file' error code is returned.

There are two special modes with which to read a file:

1) Host system 212 may read the file until either an error occurs, host system 212 issues an ABORT function, or the end of file is reached. In this way, host system 212 may request the entire file regardless of length.

2) Host system 212 may request a 'streaming' transfer in which storage device 402, 404, 406 limits the number of retries it will take during a read operation in order to satisfy the data demand of host system 212. In other words, timely delivery of the data is more critical than correctness of the data. If necessary, bad data will be transferred to host system 212, so that subsequent data may be gathered in a timely manner.

ReadDir

The 'ReadDir' command transfers a number of file system object names and attributes to host system 212. Each entry returns the following information:

a. The attributes of the object, i.e., whether the object is a file or directory, hidden, etc.

b. The identifier for the object which may be used in subsequent commands.

c. The name of the object.

The entries returned are returned in binary sorted order, i.e., alphabetical order for the ASCII character set. 'ReadDir' may optionally return just the files or just the directories in the list.

Remove

If the specified object identifier is found within the file system, then the object is qualified to make sure it is a removable object (see below). If the object is qualified for removal, it is no longer maintained within the memory of storage device 402, 404, 406. The updated file system is not necessarily committed to the disk upon completion of this command. If the file system update is not committed to disk, then CACHED_DATA status is returned.

Permission may be denied for removing the object under the following conditions:
a. The object has the GUARDED or the READONLY attribute.
b. The object is a directory, and the directory is not empty (i.e., recursive removals are not allowed)
c. A security key, or other digital rights scheme, protects the object.

Rename

'Rename' allows host system 212 to rename or move an object within file system 400. Host system 212 specifies a source object, the directory to move the object (it may be the same directory) and a new name for the object. If the source object is within the same directory, then the object is renamed. If the source directory and destination directories are different, then the object is moved from the source directory to the destination directory, potentially renaming the object at the same time. Note that if the moved/renamed object is a directory, then its entire contents, including all subdirectories and associated files are moved as well.

The identifiers associated with each file system object are not changed by this operation.

Permission may be denied for renaming/moving objects under the following conditions:
a. The object has the GUARDED or READONLY attribute.
b. A security key, or other digital rights scheme, protects the object.

SetAttributes

The SetAttributes command modifies the attributes for the specified file system object. The update is performed within the internal memory of storage device 402, 404, 406 and is not necessarily committed to the disk, in which case the CACHE_DATA bit will be set in the status. The storage device ensures the entry is written to the media prior to media removal.

Permission may be denied for renaming/moving objects under the following conditions:
a. The object has the GUARDED attribute.
b. A security key, or other digital rights scheme, protects the object.

WriteFile

The WRITE command writes data to the specified file. If it is a new file, created with the 'CreateFile' command, then the data will start at the beginning of the file. If the file already exists, then the data may be appended sequentially onto the end of the file.

File data may be cached within buffer 258 (FIG. 2), and a successful status may be returned to host system 212 before the data is actually written to storage media 230. In this case, the CACHED_DATA status bit will be set. The storage device ensures the data is written to the media prior to media removal.

In one embodiment, host system 212 may start a write command with an unspecified byte count, in which case the write continues until either an error occurs, or host system 212 stops the write. In this way, host system 212 may write an unspecified length file to storage media 230. Host system 212 initiates a write session when it issues any command that modifies the structure of files or directories on storage media 230. It often is more efficient for write once storage devices, such as storage device 406, to cache up several file system changes in data buffer 258 (FIG. 2) before committing them to storage media 230. Furthermore, it may be desirable to cache write data within buffer 258 (FIG. 2) to prevent buffer underruns on writes, each of which requires storage space to store a value for a linking sector for the file.

The preceding list of commands is an example of a set of commands that may be implemented in file system 400. It is important to note that other commands may be used in addition to, or instead of, the commands discussed above.

Accessing Storage Media

Detecting Media Insertion

In one embodiment, when storage media is inserted into storage device 402, 404, 406, an interrupt is sent to host system 212. Upon receiving the interrupt, host system 212 determines the reason for the interrupt. Upon detecting media insertion as the reason, host system 212 executes the 'GetMediaInfo' command to receive the following information:
a. An identifier to the root directory of the media. This identifier may be used as a starting point for subsequent commands such as 'ReadDir' or 'GetIdentifier'.
b. The name of the root directory (also referred to as the "Volume Name".)
c. The current statistics on the storage media including the total media size, total writable bytes left on the media, and the number of directories and files.

Once the identifier for the root directory is obtained, the storage media may be accessed using the directory and file access commands.

Traversing Directories

In file system 400, files are organized in one or more directories. Each directory may have a number of subdirectories. The 'GetMediaInfo' command is used to obtain a root directory identifier, and the files are traversed in one of two ways:
1) The list of all the directories and files within a given directory may be obtained with the 'ReadDir' command. 'ReadDir' returns both the object identifier and the name for all the file system objects within the given directory.
2) If the name of a sub-directory is known, then an identifier for that directory may be obtained with the 'GetIdentifier' command.

In either case, the directory identifier for the sub-directory may be used in subsequent 'ReadDir' or 'GetIdentifier' commands to traverse a directory structure of any length.

Creating Files and Directories

Files and directories are created with the 'CreateFile' and 'CreateDir' commands. These commands take a directory identifier as an argument, and create the new object within that directory. The new object has no data associated with it, i.e., a new file has a length of zero, and the new directory has no children.

Reading Files

Files are read using the 'ReadFile' command. The 'ReadDir' or 'GetIdentifier' commands are used to get an identifier to the file. The starting byte offset and the number of bytes to be read are passed as parameters of the command. Storage devices 402, 404, 406 access the desired file and start the transfer from the given offset. The transfer continues until the number of bytes is exhausted, or the end of the file is detected, or host system 212 aborts the 'ReadFile' command.

Host system 212 may request that data be read from the media in a "streaming" mode. In streaming mode, storage device 402, 404, 406 will prioritize delivery of the data above the accuracy of the data. Data retries will be limited in order to meet the demand for the data. If necessary, a block of data that may contain bad data will be transferred to host system 212, in order to proceed to subsequent good data. This mode provides for real-time output from storage device 402, 404, 406, to the extent storage device 402, 404, 406 is capable of delivering the data.

Locking and Unlocking Media

Because data may be cached within a buffer in storage devices 402, 404, 406, as well as within a buffer in host system 212, the ability to lock the storage media in the cartridge is required. File system 400 includes a 'Lock Media' command that is issued by host system 212 to lock the media in storage device 402, 404, 406. The media remains locked until a 'Release Media' command is issued by host system 212 and received by storage device 402, 404, 406. In this manner, host system 212 may prevent the media from being removed during an update period.

Storage device 402, 404, 406 maintains its own cache status within buffer 258 (FIG. 2). Regardless of the lock state of host system 212, storage device 402, 404, 406 will not release the media until all the storage device buffers are flushed to the storage media.

Storage device 402, 404, 406 notifies host system 212 that a user has requested the media to be removed by issuing an 'attention interrupt'.

Advantages

Advantageously, maintaining file system 400 is compatible with a variety of different host systems 212. Additionally, fewer components are required in host system 212 with file system 400 compared to file systems based on block I/O such as shown in FIG. 1. This is because host system 212 accesses information on storage device 246 using an identifier for a file system object, as compared to a series of block numbers required with block read/write devices.

Another advantage of file system 400 is that by removing storage device hardware dependency from host system 212 portability is improved. Host system 212 does not need to have knowledge of the type of storage device with which it is communicating. Therefore, file system manager 410 and translator 412 are easily ported to different host platforms. Furthermore, reliability is improved, as there is less chance for error communicating with different types of storage devices 402, 404, 406.

Another advantage of file system 400 is that storage devices 402, 404, 406 may implement read-ahead caching even on files that are fragmented on the storage media. This is because storage devices 402, 404, 406 understand the file structure, and therefore know which segments of the storage media to access to read a particular file. Additionally, repetitive patterns of host file accesses may be detected to perform file group read-ahead. This is particularly useful in situations where the file accesses tend to be very complex but repetitive in nature, such as the boot-up process for host system 212.

Another advantage of file system 400 over block devices is that the format of the storage media may change without requiring any change to file system manager 410 or translator 412. For example, advances in technology for WORM storage device 406 may allow the device to perform read/modify/write operations on the media. In this case, new versions of WORM storage device 406 may be used without changing host system file system manager 410 or translator 412 in any way.

A further advantage is that file system can implement a security system at the file and directory level. Digital rights management schemes implemented entirely within storage devices 402, 404, 406 can be made much more secure than security systems implemented on host system 212, since host system 212 is often a general-purpose, open-development environment such as a personal computer.

While the invention has been described with respect to the embodiments and variations set forth above, these embodiments and variations are illustrative and the invention is not to be considered limited in scope to these embodiments and variations. Accordingly, various other embodiments and modifications and improvements not described herein may be within the spirit and scope of the present invention, as defined by the following claims.

What is claimed is:

1. A file system for accessing information on a digital storage medium within a storage device, wherein the information comprises file system objects, each file system object being either a file or a directory, the file system comprising:
   a storage device controller in the storage device, the storage device controller including:
      an interface component operable to receive a packet of variable length, wherein the packet includes a file system command, the file system command being either a request to read a file system object from the digital storage medium or a request to write a file system object to the digital storage medium, the interface component being further operable to generate an identifier for the file system object specified in the file system command, and wherein the file system object is accessed by the interface component using the identifier;
      a command decode component operable to decode the file system command; and
      an interface response structure component operable to create a strategy for performing the file system command.

2. The file system of claim 1 further comprising a reading and writing component operable to perform storage media access functions.

3. The file system of claim 1, further comprising: a host system coupled to the storage device, the host system comprising:
   a file system manager operable to receive a storage device access request from an application program; and
   a translator coupled to the file system manager, the translator being operable to generate the file system command based on the storage device access request.

4. The file system of claim 3, wherein the host system further comprises a hardware device driver coupled between the translator and the storage device, the translator being operable to generate the packet, wherein the packet includes the file system command and the identifier for the file system object to be accessed, and wherein the hardware driver is configured to add routing information to the packet.

5. The file system of claim 1 wherein the file system object is a file.

6. The file system of claim 1 wherein the file system object is a directory.

7. The file system of claim 3 wherein the translator correlates the identifier to a pathname for the file system object.

8. The file system of claim 1 wherein the identifier is generated when the file system object is created.

9. The file system of claim 1 wherein the storage device is operable to access an entire file system object based on the identifier.

10. The file system of claim 1 wherein the storage device includes a security manager to prevent unauthorized access to file system objects on the storage device.

11. The file system of claim 1 wherein the storage device controller includes library functions for setting attributes of the file system object.

12. The file system of claim 1 wherein the storage device controller includes library functions for retrieving attributes of the file system object.

13. The file system of claim 1 wherein the storage device controller includes library functions for retrieving file system statistics.

14. The file system of claim 1 wherein the storage device controller includes library functions for retrieving the identifier of the file system object.

15. The file system of claim 1 wherein the storage device controller includes library functions for creating, renaming, and removing the file system object.

16. The file system of claim 1 wherein the storage device controller includes library functions for setting and retrieving a type identifier of the file system object, wherein the type identifier indicates the format of the file system object.

17. The file system of claim 1 wherein the storage device controller is operable to determine when storage media is inserted in the storage device.

18. The file system of claim 1 wherein the storage device controller is operable to lock and unlock the storage media in the storage device.

19. A method for accessing information on a digital storage medium within a storage device, wherein the information comprises file system objects, each file system object being either a file or a directory, the method comprising:

generating an identifier for a file system object in a storage device controller in the storage device;

receiving a packet of variable length, wherein the packet includes a file system command, and wherein the file system command is either a request to read the file system object from the digital storage medium or is a request to write the file system object to the digital storage medium;

decoding the file system command using a command decode component in the storage device; and creating a strategy for performing the file system command using an interface response structure component in the storage device.

20. The method of claim 19 further comprising performing storage media access functions using a reading and writing component in the storage device controller.

21. The method of claim 19, further comprising:

receiving a storage device access request from an application program using a file system manager in a host system, wherein the host system is coupled to the storage device; and generating the file system command based on the storage device access request using a translator coupled to the file system manager.

22. The method of claim 21, further comprising generating the packet including the file system command.

23. The method of claim 19 wherein the file system object is a file.

24. The method of claim 19 wherein the file system object is a directory.

25. The method of claim 21 further comprising correlating the identifier to a pathname for the file system object.

26. The method of claim 19 wherein the identifier is generated when the file system object is created.

27. The method of claim 21 further comprising accessing an entire file system object based on the identifier.

28. The method of claim 19 further comprising preventing unauthorized access to file system objects on the storage device using a security manager in the storage device controller.

29. The method of claim 19 further comprising setting attributes of the file system object using library functions in the storage device controller.

30. The method of claim 19 further comprising retrieving attributes of the file system object using library functions in the storage device controller.

31. The method of claim 19 further comprising retrieving file system statistics using library functions in the storage device controller.

32. The method of claim 19 further comprising retrieving the identifier of the file system object using library functions in the storage device controller.

33. The method of claim 19 wherein the storage device controller includes library functions for creating, renaming, and removing the file system object.

34. The method of claim 19 wherein the storage device controller includes library functions for setting and retrieving a type identifier of the file system object, wherein the type identifier indicates the format of the file system object.

35. The method of claim 19 wherein the storage device controller is operable to determine when storage media is inserted in the storage device.

36. The method of claim 19 wherein the storage device controller is operable to lock and unlock the storage media in the storage device.

* * * * *